Sept. 26, 1961    H. A. TOMARIN    3,001,665
CONTAINER AND COVER THEREFOR
Filed June 12, 1957    2 Sheets-Sheet 1
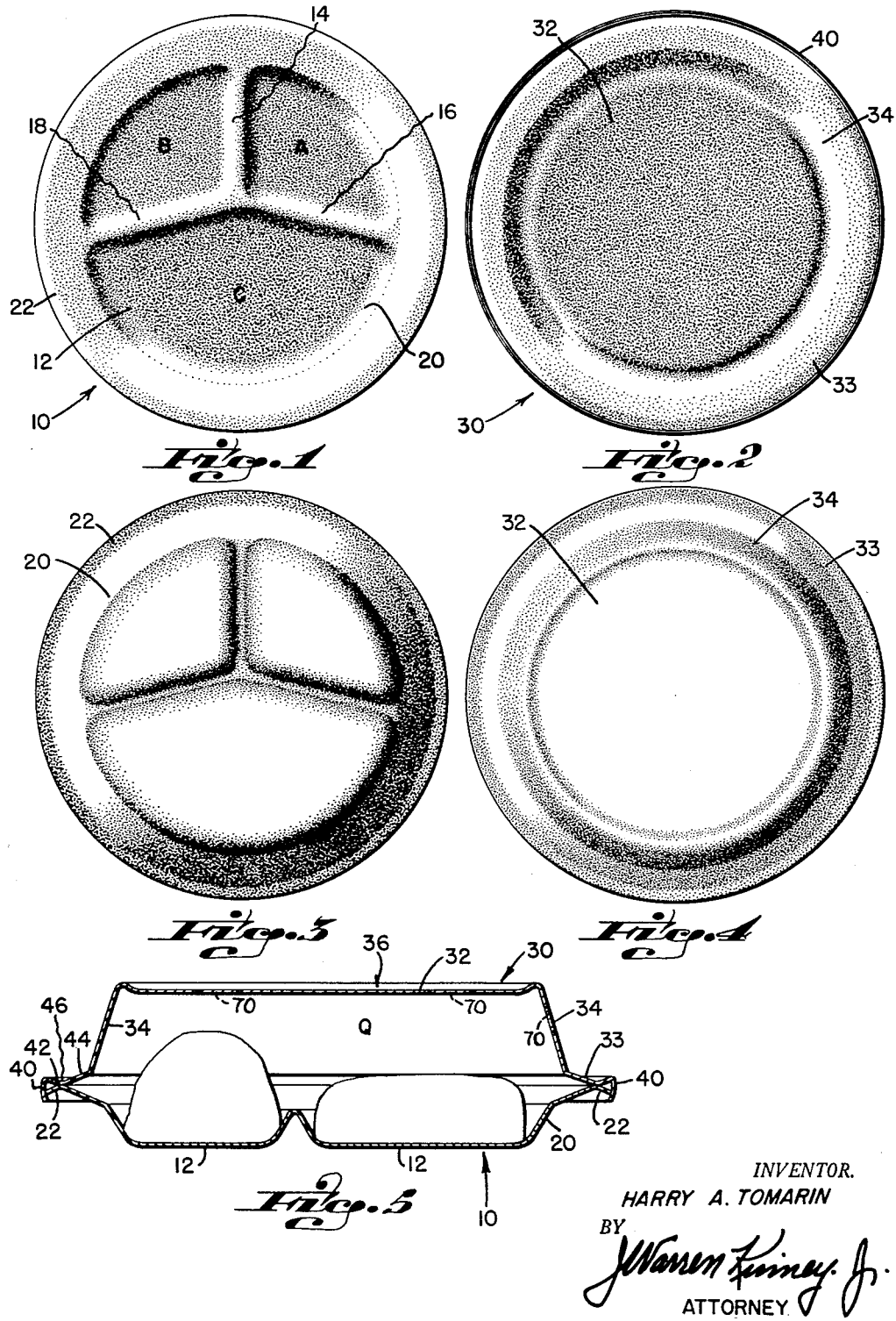
INVENTOR.
HARRY A. TOMARIN
BY
ATTORNEY Sept. 26, 1961 H. A. TOMARIN 3,001,665
CONTAINER AND COVER THEREFOR
Filed June 12, 1957 2 Sheets-Sheet 2
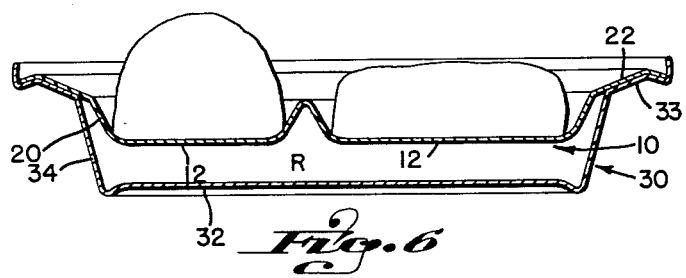
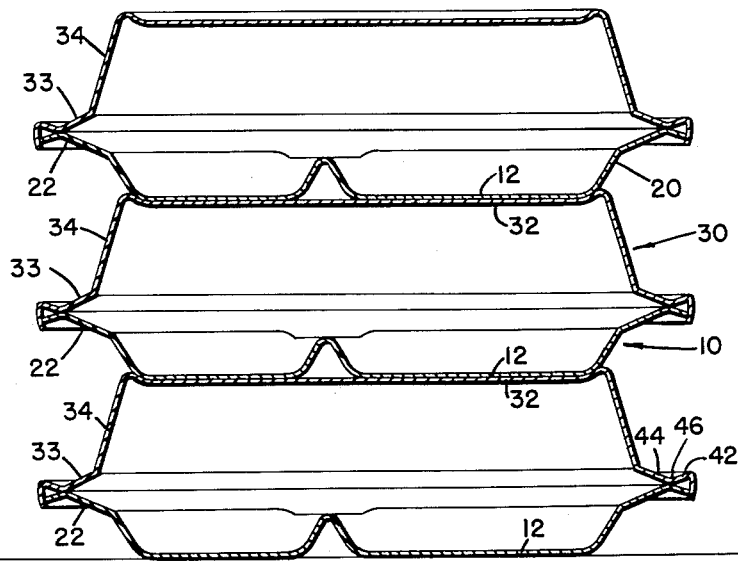
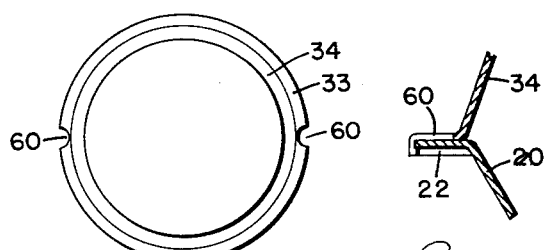 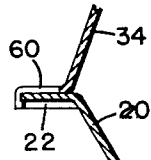
INVENTOR.
HARRY A. TOMARIN
BY
ATTORNEY ional unit, as illustrated in FIG. 5.
United States Patent Office 3,001,665
Patented Sept. 26, 1961

3,001,665
CONTAINER AND COVER THEREFOR
Harry A. Tomarin, 7210 Parkdale, Cincinnati, Ohio
Filed June 12, 1957, Ser. No. 665,312
2 Claims. (Cl. 220—4)

This invention relates to containers, and more particularly to a cover for a dish to provide an improved container which may be utilized for storing, transporting and serving items such as, by way of example, complete meals.

An object of the invention is to provide a cover for a dish for providing a closed container in which the contents of the dish may be stored, treated, transported and served while completely inclosed, and which cover, when removed from the dish, may be utilized as a base or support therefor.

Another object of the invention is to provide a container having a cover provided with means which are dimensioned to securely though releasably engage the peripheral edge of a dish for providing a closed compartment defined by the cover and dish portions, and wherein the cover is provided with means for receiving the bottom portion of the dish of another similar container assembly for facilitating the stacking of such containers in nested relationship.

Still another object of the invention is to provide a container having a cover having the hereinabove described characteristics and which may, when removed from a compartment-forming relationship with a dish, be placed beneath and secured to the dish in a manner to protect and insulate the external faces of the dish.

A further object of the invention is to provide a cover member which is so inexpensive as to permit it to be used but once and then discarded; said inexpensive cover adapted to be used in conjunction with other inexpensive, disposable dishes, or with dishes which are adapted to be reused, after washing.

These and other objects are attained by the means described herein and as disclosed by the accompanying drawings, in which:

FIG. 1 is a top plan view of a typical dish with which the cover member of the present invention may be associated.

FIG. 2 is a top plan view of a cover member embodying the teachings of the present invention.

FIG. 3 is a bottom plan view of the dish of FIG. 1.

FIG. 4 is a bottom plan view of the cover of FIG. 2.

FIG. 5 is a vertical section through a container formed from the dish and cover of FIGS. 1 and 2.

FIG. 6 is a view similar to FIG. 5, showing the relationship of the cover member of FIG. 2 associated with the external faces of the dish.

FIG. 7 is a view similar to FIG. 5, showing the manner in which my invention permits the nesting of a plurality of cover-and-dish compartments.

FIG. 8 is a top plan view of a modified type of cover member.

FIG. 9 is a fragmentary sectional view of the cover of FIG. 8 associated with a dish.

With particular reference to FIGS. 1, 3 and 5, the numeral 10 denotes generally a concave dish, container or platter fabricated from inexpensive, disposable material, or from a more durable type of material for providing a reusable dish. The dish includes a bottom 12 which, if desired, may be provided with raised rib-like portions 14, 16 and 18 for subdividing it into sub-compartments A, B and C; and side walls 20 extending upwardly and outwardly from the bottom and which terminate in a peripheral rim or flange 22.

It should be clearly understood that whereas dish 10 has been illustrated as circular in form, such form is exemplary rather than restrictive, since the present invention is directed to dishes having shapes other than circular, such as rectangular, square, oval, and the like.

In FIGS. 2, 4 and 5, the numeral 30 denotes generally a concave cover member having a shape and size complementary to the shape and size of dish 10. Cover 30 includes a top wall 32, side walls 34 which extend downwardly and outwardly therefrom and a peripheral rim or flange 33 terminating in or provided with means to securely though releasably engage the peripheral edge or rim 20 of dish 10, note FIG. 5.

In the preferred embodiment of the invention, top wall 32 of the cover is recessed as at 36 to provide a recess or depression dimensioned to receive the bottom of a dish 10, note FIG. 7.

From the foregoing, it will be noted that when cover 30 is associated with dish 10, as in FIG. 5, a closed chamber Q is provided in which the products carried by the dish will be housed. While in such a closed chamber the contents thereof may be subjected to heat or refrigeration, storage and/or transportation until delivered or served to the ultimate user of the device, at which time the cover may be removed from the dish for exposing the contents thereof.

The use of my cover enables food to be dished and then sealed off against contamination during further treatment, storage and transportation to the ultimate user, and, as illustrated in FIG. 7, a plurality of compartments, each comprising a cover and dish, may be stacked in vertical nested relationship.

As best illustrated in FIG. 6, when cover 30 has been removed from dish 10, it may be placed beneath the dish and then securely though releasably attached thereto by the dish-edge engaging means for locating the cover relative to the lower or external surfaces of the dish. When so disposed, a chamber R is provided between the adjacent faces of the bottom of dish 10 and the inner surface of the cover 30.

With particular reference now to FIGS. 5, 6 and 7, it will be noted that the outer edge of the cover member includes a depending portion 40 which is adapted to overlappingly engage the peripheral rim 22 of a dish for effecting a secure, though releasable, interlock.

In the preferred embodiment of the invention, those portions of the cover between side walls 34 and depending portion 40 are shaped to provide a pair of downwardly convergent portions 42 and 44 which collectively comprises a V-shaped panel. A downward pressure applied to the inner end of portion 44 will effectively lift the depending portion 40 upwardly relative to rim 20 of the dish, about a fulcrum 46 which engages a portion of the rim of the dish.

It should be understood that the dish-edge engaging means of the cover may be continuous, or it may comprise a plurality of radially projecting, circumferentially spaced, locking segments.

With particular reference now to FIG. 8, it will be noted that I have provided cut-out portions 60 in the outer edge of peripheral rim 33 of the cover member 30. These cut-out portions, as best illustrated in FIG. 9, are adapted to overlie the peripheral rim 22 of the dish member 10. The cut-out portions 60 are preferably dimensioned whereby to accommodate the thumb of a person for applying a downward pressure directly to peripheral edge 22 of the dish, thereby facilitating loosening and removal of the cover member 30.

It should, of course, be understood that, if desired, the top panel 36 of cover member 30 may be provided with a transparent insert for making it possible to observe the contents of a completed unit, as illustrated in FIG. 5. The present invention likewise contemplates lining the interior of the cover and/or dish members with foil, wax, or any other substance for rendering the device more usable; for increasing its thermal efficiency, and decreasing its grease-absorbent characteristics.

If desired, openings or weakened push-out plugs 70 may be provided in the cover member for facilitating the escape of steam which, if trapped within chamber Q of FIG. 5, might tend to impair the appearances or palatability of the food products.

What is claimed is:

1. A two-piece container comprising a lower portion and an upper portion, said lower portion including an upstanding side wall, said lower portion also including a pair of upwardly convergent portions supported by the upper portion of said upstanding side wall, said upwardly convergent portions defining a substantially inverted V-shaped panel and one of said upwardly convergent portions having an outer periphery defining a rim portion, said upper portion of the container including a depending side wall, said upper container portion also including a pair of downwardly convergent portions supported at the lower portion of said depending side wall and defining a substantially V-shaped panel, the outer edge of one of said downwardly convergent portions of the top portion of the container including a depending portion adapted to overlappingly engage said rim portion of the lower portion of the container with the apex portions of said V-shaped panels in engagement with one another to provide a secure sealing interlock between said upper and lower portions of the container.

2. Apparatus as defined in claim 1, wherein said V-shaped panels are of substantially complementary configuration whereby said upper portion of the container is adapted to be inverted and serve as a support for the lower portion of the container, said V-shaped sections being in complementary nested relationship with one another to provide a secure and positive interlock between said upper and lower portions of the container when the upper portion is utilized as a support for the lower portion.

References Cited in the file of this patent

UNITED STATES PATENTS

| | | |
|---|---|---|
| 1,268,064 | Johnson | May 25, 1918 |
| 1,374,389 | Reichenbach | Apr. 12, 1921 |
| 1,717,974 | Heinrichs | June 18, 1929 |
| 2,350,950 | Wiley | June 6, 1944 |
| 2,585,180 | Smith | Feb. 12, 1952 |
| 2,780,385 | Tupper | Feb. 5, 1957 |
| 2,811,152 | Wicks | Oct. 29, 1957 |
| 2,833,324 | Burroughs | May 6, 1958 |
| 2,863,581 | Piker et al. | Dec. 9, 1958 |